United States Patent
Klaus-Nietrost et al.

(10) Patent No.: US 12,312,421 B2
(45) Date of Patent: May 27, 2025

(54) MOLDED BODY WHICH COMPRISES ELASTANE INCORPORATED IN CELLULOSE AND MANUFACTURING METHOD

(71) Applicant: LENZING AKTIENGESELLSCHAFT, Lenzing (AT)

(72) Inventors: Christoph Klaus-Nietrost, Vöcklabruck (AT); Richard Herchl, Ried im Innkreis (AT); Christian Weilach, Vöcklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 1228 days.

(21) Appl. No.: 16/962,502

(22) PCT Filed: Jan. 14, 2019

(86) PCT No.: PCT/EP2019/050743
§ 371 (c)(1),
(2) Date: Jul. 15, 2020

(87) PCT Pub. No.: WO2019/138093
PCT Pub. Date: Jul. 18, 2019

(65) Prior Publication Data
US 2021/0079121 A1    Mar. 18, 2021

(30) Foreign Application Priority Data
Jan. 15, 2018    (EP) .................................... 18151674

(51) Int. Cl.
*C08B 16/00*    (2006.01)
*B29C 48/00*    (2019.01)
(Continued)

(52) U.S. Cl.
CPC ............ *C08B 16/00* (2013.01); *B29C 48/022* (2019.02); *D01F 1/02* (2013.01); *D01F 2/06* (2013.01); *B29K 2001/00* (2013.01)

(58) Field of Classification Search
None
See application file for complete search history.

(56) References Cited

U.S. PATENT DOCUMENTS

| | | |
|---|---|---|
| 3,801,273 A | 4/1974 | Mays |
| 3,937,671 A | 2/1976 | Gruntfest et al. |

(Continued)

FOREIGN PATENT DOCUMENTS

| | | |
|---|---|---|
| CA | 2923780 A1 | 4/2015 |
| CN | 1469943 A | 1/2004 |

(Continued)

OTHER PUBLICATIONS

Chinese Office Action for Application No. 201980008637.6, dated Aug. 3, 2022, 38 pages.

(Continued)

*Primary Examiner* — Stefanie J Cohen
(74) *Attorney, Agent, or Firm* — Womble Bond Dickinson (US) LLP

(57) ABSTRACT

A method of manufacturing a molded body which comprises cellulose, wherein the method comprises: i) providing a starting material which comprises cellulose and elastane, in particular wherein the elastane in the starting material is present separated from the cellulose, wherein the starting material is a solid body, and ii) generating the molded body which comprises cellulose, in particular by a lyocell-method or a viscose-method, on basis of the starting material, such that the regenerated cellulosic molded body comprises at least a part of the elastane of the starting material. The part of the elastane of the starting material is incorporated in the (Continued)

regenerated cellulosic molded body. Furthermore, a regenerated cellulosic molded body which comprises elastane incorporated in the cellulose, and which is manufactured according to a lyocell-method or a viscose-method.

7 Claims, 3 Drawing Sheets

(51) Int. Cl.
*D01F 1/02* (2006.01)
*D01F 2/06* (2006.01)
*B29K 1/00* (2006.01)

(56) References Cited

U.S. PATENT DOCUMENTS

| | | | |
|---|---|---|---|
| 4,246,221 A | 1/1981 | McCorsley | |
| 4,345,039 A | 8/1982 | Cowan et al. | |
| 4,470,250 A | 9/1984 | Arenz et al. | |
| 5,240,530 A | 8/1993 | Fink | |
| 5,598,980 A | 2/1997 | Dilly-Louis et al. | |
| 5,601,767 A | 2/1997 | Firgo et al. | |
| 5,722,603 A | 3/1998 | Costello et al. | |
| 6,258,304 B1 | 7/2001 | Bahia | |
| 9,840,037 B2 | 12/2017 | Roup | |
| 2002/0031663 A1* | 3/2002 | Yu | D01F 1/04 264/188 |
| 2008/0299160 A1* | 12/2008 | Agboh | C08J 5/005 424/641 |
| 2009/0170078 A1 | 7/2009 | Tsuji et al. | |
| 2011/0057346 A1* | 3/2011 | Nunn | D04H 1/4274 28/103 |
| 2014/0343270 A1* | 11/2014 | Lindstrom | D01F 2/00 536/57 |
| 2015/0329771 A1 | 11/2015 | Danielec et al. | |
| 2016/0237619 A1 | 8/2016 | Weilach et al. | |
| 2019/0338466 A1* | 11/2019 | Brinks | C08B 16/00 |

FOREIGN PATENT DOCUMENTS

| | | |
|---|---|---|
| CN | 102154722 A | 8/2011 |
| CN | 102250379 A | 11/2011 |
| CN | 105765116 A | 7/2016 |
| CN | 106146877 A | 11/2016 |
| DE | 44 09 335 A1 | 9/1994 |
| DE | 198 82 319 T1 | 7/2000 |
| DE | 696 18 988 T2 | 9/2002 |
| EP | 0 205 346 B1 | 12/1986 |
| EP | 0 636 646 A1 | 2/1995 |
| EP | 0 681 896 A1 | 11/1995 |
| EP | 3 339 504 A1 | 6/2018 |
| EP | 3 511 140 A1 | 7/2019 |
| JP | S588147 A | 1/1983 |
| JP | H07504719 A | 5/1995 |
| JP | 109505119 A | 5/1997 |
| JP | 20050023448 A | 1/2005 |
| JP | 2012254400 A | 12/2012 |
| JP | 2014151238 A | 8/2014 |
| JP | 2016536476 A | 11/2016 |
| TW | 201529916 A | 8/2015 |
| WO | 96/07778 A1 | 3/1996 |
| WO | WO 97/021490 A2 | 6/1997 |
| WO | 9807911 A1 | 2/1998 |
| WO | 0231236 A1 | 4/2002 |
| WO | WO 02/40766 A2 | 5/2002 |
| WO | WO 2013/182801 A1 | 12/2013 |
| WO | WO 2014/045062 A1 | 3/2014 |
| WO | WO 2014/086579 A1 | 6/2014 |
| WO | WO 2015/049040 A1 | 4/2015 |
| WO | WO 2016/123643 A1 | 8/2016 |
| WO | 2017019802 A1 | 2/2017 |
| WO | 2018/115428 A1 | 6/2018 |

OTHER PUBLICATIONS

International Search Report of corresponding PCT/EP2019/050743, dated Mar. 15, 2019, 5 pages.
Written Opinion of corresponding PCT/EP2019/050743, dated Mar. 15, 2019, 8 pages.
Search Report of corresponding EP 18151674.1, dated Jul. 4, 2018, 7 pages.
Office Action of corresponding TW application 108101352, dated Dec. 5, 2019, 29 pages with English translation.
Decision of Rejection of corresponding TW application 108101352, dated Dec. 5, 2019, 21 pages with English translation.
Ouchi, et al., "A new methodology to recycle polyester from fabric blends with cellulose," Cellulose 17.1 (2010), pp. 215-222.
Golova, et al., "Structure—Properties Interrelationships in Multicomponent Solutions Based on Cellulose and Fibers Spun Therefrom," Cellulose—Fundamental Aspects, chapter 13, 2013, pp. 303-342.
Scholz, "Thermoplastisches Polyurethan," Index | FAPU 15, Nov./Dec. 2002 | Fachartikel, 4 pages.
Tausif, et al., "Mechanical Properties of Nonwoven Reinforced Thermoplastic Polyurethane Composites," Materials 2017, 10, 618, 13 pages.
"Einzigartig wie ein Fingerabdruck", Markt & Technik 38/2013, 2 pages.
Japanese Office action for Application No. 2020-537492, dated Jan. 18, 2023, 10 pages.
Webpage of lycra, retrieved at https://www.lycra.com/en/lycra-about-lycra-fiber/see-how-lycra-fiber-has-shaped-world#:~:text=The%20research%20into%20a%20stretch,the%20rubber%20that%20inspired%20it., 3 pages, Sep. 2024.
Nilsson, C., et al., Assessing Denim Quality, Bachelor Thesis in textile Technology, Swedish School of Textiles, 2012, 46 pages.
Trusted and Proven FR Fabric Solutions, retrieved at https://www.westex.com/webfoo/wp-content/up., 12 pages, 2024.
European Office action for Application No. 18 151 674.1, dated Aug. 26, 2024, 11 pages.

* cited by examiner

MOLDED BODY WHICH COMPRISES ELASTANE INCORPORATED IN CELLULOSE AND MANUFACTURING METHOD

CROSS-REFERENCE TO RELATED APPLICATION

This application is a National Phase Patent Application and claims priority to and the benefit of International Patent Application No. PCT/EP2019/050743, filed Jan. 14, 2019, which claims priority to and the benefit of European Patent Application No. EP 18151674.1, filed Jan. 15, 2018, the entire contents of all of which are incorporated herein by reference.

FIELD OF INVENTION

The invention concerns a regenerated cellulosic molded body and a method of manufacturing the molded body.

BACKGROUND

The invention relates to the technical field of reusing (recycling), in particular reusing of starting materials which comprise cellulose. Further in particular, the invention concerns a reusing of these starting materials for manufacturing a molded body which also comprises cellulose, in particular wherein the cellulose of the molded body substantially is present in form of lyocell fibers and/or viscose fibers.

As viscose fibers, chemical fibers and regenerated fibers are denoted, which are manufactured by means of a wet spinning method which is called viscose-method. The starting raw material of the viscose-method is cellulose which is provided on the basis of wood. From this starting raw material wood, the highly pure cellulose in form of chemical pulp is obtained. In subsequent process stages, the pulp is first treated with caustic soda, whereby alkali cellulose is formed. In a subsequent conversion of said alkali cellulose with carbon disulfide, xanthogenate is formed. From this, by further supplying caustic soda, the viscose-spinning solution is generated which is pumped through holes of shower-like spinning nozzles into a spinning bath. There, one viscose-filament per spinning nozzle hole is generated by coagulation. The such manufactured viscose-filaments are subsequently cut to viscose-staple fibers.

Lyocell denotes a regenerated fiber type comprising cellulose, which is manufactured according to a direct solvent method. The cellulose for the lyocell-method is extracted from the raw material wood. The such obtained pulp may subsequently be solved in N-methylmorpholine-N-oxide (NMMO), a solvent, by dehydration without chemical modification, filtered, and subsequently pressed through spinning nozzles. The such formed filaments, after passing an air gap, are precipitated in a bath with an aqueous NMMO-solution and are subsequently cut to staple fibers.

When using materials as raw materials for obtaining cellulose, frequently the problem of the purity of said starting materials occurs. The starting materials are frequently contaminated with materials which are not typical for wood. In particular, e.g. present old textiles (old clothes and/or remains from the clothing manufacture) are highly contaminated with synthetic plastics. On the one hand, since they consist of plastics to a large extent. However, on the other hand, since also many old textiles which are mainly consisting of natural fibers, are at least partially contaminated with plastic portions at present. When processing these recycling materials (textile recycling), different undesired foreign matters as the mentioned synthetic plastics occur when a substance cycle is closed, which have to be removed in the manufacturing of the fiber, for the purpose that the technical/physical properties become suitably similar with respect to a non-recycled fiber. Usually, such foreign matters, in particular polyurethane, are removed as completely as possible. Thus, in order to obtain cellulose which is as pure as possible, a depleting of said synthetic plastics is necessary. However, in particular the depletion of polyurethane (e.g. elastane from elastic sportswear) is especially elaborate.

A further problem when using recycled materials, such as old textiles, with respect to a lyocell-method and/or viscose-method, is that the celluloses which are recovered from old textiles, typically comprise relatively short chain lengths. The recycled fibers then comprise other properties as non-recycled fibers, which is typically not desired.

SUMMARY

It is an object of the present invention to manufacture cellulose products with specific properties in a resource-saving and durable manner.

This object is solved by the subject-matters according the independent patent claims. Preferred embodiments result from the dependent patent claims.

According to an aspect of the present invention, a regenerated cellulosic molded body is provided which comprises elastane incorporated in the cellulose, and which is manufactured according to a lyocell-method or a viscose-method.

According to a further aspect of the present invention, a method of manufacturing a molded body which comprises cellulose is provided, wherein the method comprises: i) providing a starting material which comprises cellulose and elastane, in particular wherein the elastane in the starting material is present separated from the cellulose, wherein the starting material is a solid body, and ii) generating the molded body which comprises cellulose, in particular by a lyocell-method or a viscose-method, on basis of the starting material, such that the regenerated cellulosic molded body comprises at least a part of the elastane of the starting material incorporated in the cellulose. Here, the part of the elastane of the starting material is incorporated in the regenerated cellulosic molded body.

In the context of this application, the term "cellulose" may in particular denote an organic compound which is a component of plant cell walls or can be manufactured synthetically. Cellulose is a polysaccharide (i.e. a multiple sugar). Cellulose is unbranched and typically comprises multiple hundred up to ten thousands $\beta$-D-glucose molecules ($\beta$-1, 4-glycosidic linkage) and cellobiose-units, respectively. From cellulose molecules, cellulose fibers are built by plants in a controlled manner. By means of a technical process, cellulose molecules can be agglomerated under formation of regenerated fibers, for example as tearproof fibers.

In the context of this application, the term "molded body" may in particular denote a two-dimensional or three-dimensional geometric body which is a result of a method of manufacturing and recovery, respectively, of cellulose. In particular, a molded body denotes a two-dimensional or three-dimensional object which comprises cellulose or consists of it and is manufactured from solved pulp. Molded bodies may be in particular lyocell-molded bodies, viscose-molded bodies or modal-molded bodies. Typical molded bodies are filaments, fibers, sponges and/or films. Basically, all types of cellulose molded bodies are suitable for embodiments of the invention. Both endless filaments and cut staple fibers with conventional dimensions (for example 38 mm length) and short fibers are considered as fibers. For manufacturing fibers, both methods with withdrawing devices downstream of one or more extrusion nozzles and also other methods, as in particular melt-blowing-methods, are possible. Alternatively to fibers, a foil which comprises cellulose can be manufactured as molded body, i.e. a planar and substantially homogenous film with or made of cellulose. Foils may be in particular manufactured by adjusting the process parameters of a lyocell-method such that coagulating is at least partially triggered only after the filaments impinge on a receiving surface. Planar cellulose molded bodies are considered as foils, wherein the thickness of these foils is adjustable (for example by selecting a number of serially arranged nozzle beams). Other embodiments of a molded body are a tissue and a fleece made of cellulose filaments and cellulose fibers, respectively, in particular a spinning fleece made of integrally merged ("merging") substantially continuous cellulose filaments ("melt blown"). Here, in particular a textile planar structure made of at least two (preferably orthogonal or almost orthogonal) crossed thread systems (or fiber systems) may be considered as a tissue, wherein threads (or fibers) in longitudinal direction may be denoted as warp threads and threads (or fibers) in a transverse direction may be denoted as weft threads. A fleece or nonwoven may be denoted as disordered (in particular present in random orientation) structure of filaments or fibers or cut yarn with limited length which are joined together to a fiber layer or a fiber web and which are connected to each other (in particular in a frictionally engaged manner). A molded body may also be created in the form of a sphere. As molded body, also cellulose-comprising particles, as in particular beads (i.e. a granulate and spherules, respectively) or flakes may be provided which can be further processed in this form. Thus, possible cellulose molded bodies are also particulate structures as granulate, spherical powder or fibrids. A shaping of a molded body is preferably performed by extrusion of a spinning solution which contains cellulose through an extrusion nozzle, since large amounts of cellulose molded bodies with a very uniform shape can be manufactured in this way. A further possible cellulose molded body is a sponge or, more general, a porous molded body. According to exemplary embodiments, the mentioned molded bodies can be used for manufacturing yarns, textiles, gels or composite materials, for example.

In the context of this application, the term "cellulose source" may in particular denote a medium (in particular a solid body medium) which, as basis for manufacturing a molded body which comprises cellulose, during a corresponding manufacturing method, provides the cellulose material used for this purpose. An example is wood and wood pulp, respectively.

In the context of this application, the term "lyocell-method" may in particular denote a method of manufacturing cellulose according to a direct solvent method. The cellulose for the lyocell-method can be obtained from a starting material which contains said cellulose. In the lyocell-method, the starting material can be solved in a suitable solvent (in particular comprising tertiary amine oxides, such as N-methylmorpholine-N-oxide (NMMO) and/or ionic liquids, i.e. low-melting salts made of cations and anions). Solving may be performed in particular by dehydration and/or without chemical modification. The obtained solution, which may be also denoted as dope or spinning solution, may subsequently be pressed through one or more spinning nozzles in the lyocell-method. Thereby formed filaments can be precipitated during and/or after their free or controlled fall through an air gap in a water containing bath (in particular in a bath with aqueous NMMO-solution) and/or in the air humidity present in the air gap.

In the context of this application, the term "viscose-method" may in particular denote a method of manufacturing cellulose according to a wet spinning method. The cellulose for the viscose-method can be obtained from a starting material (in particular wood or a wood pulp) which contains said cellulose. In subsequent process stages in the viscose-method, the starting material can first be treated with a base (for example caustic soda), whereby alkali cellulose is formed. In a subsequent conversion of said alkali cellulose with carbon disulfide, cellulose-xanthagonate is formed. From this, by a further supply of a base (in particular caustic soda), a viscose-spinning solution can be produced which can be pressed through one or more spinning nozzles. In a spinning bath, viscose-filaments are generated by coagulation.

In the context of this application, the term "remains from a clothing manufacture" may in particular denote waste and/or offcut of a textile or yarn which comprises or consists of cellulose, wherein said remains occur during a method of manufacturing clothes. In manufacture of clothing, for example a textile which comprises cellulose is manufactured as starting material, from which planar parts (for example in form of a half T-shirt) are cut. Remains are left, which can be resupplied to a method of manufacturing a molded body which comprises cellulose, according to an exemplary embodiment. Thus, remains from a clothing manufacture may be a starting material which comprises or consists of cellulose, which can be used for recovering cellulose before a consumer has used the remains as clothes or in another way. In particular, the remains from a clothing manufacture may be made of substantially pure cellulose, in particular without foreign matters which are separate and do not comprise cellulose (as buttons, textile print or seams, for example).

In the context of this application, the term "old clothes" may denote clothes, in particular comprising cellulose, which have been already used (in particular worn) by a user when at least a part of the cellulose is recovered. Thus, old clothes may be a starting material comprising cellulose which may (but does not have to) comprise a substantial amount of foreign matters and which may be used for recovering cellulose, after a user has used the old clothes as clothing or in any other way. In particular, old clothes may be made of a mixture of cellulose and one or more foreign matters, in particular comprising (in particular frequently used in clothing) synthetic plastic (as polyester and/or elastane, for example) and/or foreign matters which are separate and do not comprise cellulose (such as buttons, textile print or seams). Polyester may in particular denote polymers with ester functions (R—[—CO—O—]—R) in their main chain. Polycarbonates and polyethylene terephthalate belong to polyesters. Elastane in particular denotes an extensible chemical fiber with a high elasticity. A block copolymer which is underlying elastane may contain 85% by weight polyurethane.

In the context of this application, the term "synthetic plastic" may in particular denote a substance which is made of macromolecules and manufactured synthetically. The respective macromolecules of a plastic are polymers and thus are made of repeating basic units (repeating units). The size of the macromolecules of a polymer may vary between several thousand up to more than one million basic units. For example, the polymer polyethylene (PE) is consisting of multiply repeating ethylene units connected to each other. Here, the polymers may be unbranched, branched or cross-linked molecules. With respect to their physical properties, plastics can basically be separated into three groups: thermoplastics, duroplastics and elastomers. Furthermore, these properties may be combined in subgroups, e.g. in thermoplastic elastomers. Important features of plastics are their technical properties such as formability, strength, elasticity, fracture strength, temperature resistance, dimensional resistance under heat, and chemical resistance, which can be varied within a wide range by the selection of the macromolecules, the manufacturing method and typically by adding additives. Typical reactions for manufacturing synthetic plastic from monomers or pre-polymers are: chain polymerization, polyaddition or polycondensation. Examples for synthetic plastics which in particular are also used in textiles are e.g. polyurethane (PUR), in particular in elastane, polyester (PE, e.g. polyethylene terephtalate (PET)), polyamide (PA, e.g. nylon, perlon) and polyether, in particular polyethylene glycol (PEG) as component of elastane.

In the context of this application, the term "elastane" may in particular denote a synthetic plastic which comprises thermoplastic and elastic properties. Elastane may thus be denoted as thermoplastic elastomer (TPE). Elastane may be present as block-copolymer which is in particular characterized by the following both blocks: polyurethane (PUR) and polyethylene glycol ether (PEG). Here, the PUR segments may form stiff sections which alternate with soft, elastic PEG sections. PUR may form stiff, extended sections which attach longitudinal with respect to each other and enable the cohesion of e.g. a fiber by the formation of secondary valency forces. In contrast, the rubber-like PEG blocks (e.g. respectively approximately 40 to 50 monomer units) may be present in a highly intertwined manner, wherein however they may also be extended. Here, elastane may be present as curly structure with a very high extensibility (multiple 100% by weight, e.g. 700% by weight). The density may e.g. be between 1.1 and 1.3 $g/cm^3$ and the strength may be 5 to 12 cN/tex, for example. The elasticity may be temperature-dependent. Furthermore, the term "elastane" may denote both elastane itself and related thermoplastic elastomers (e.g. ellastolan, desmopan, texin, utechllan).

In the context of this application, the term "be present separated" may in particular denote that a substance is not incorporated in another substance. For example, cellulose fibers are present in a starting material and elastane is also present in the starting material. Here, the elastane may be incorporated in the cellulose fibers. Moreover, the elastane may also be present separated from the cellulose fibers. In this case, the elastane is a component of the starting material, but is not integrated in the cellulose fiber.

According to an exemplary embodiment of the invention, it was surprisingly found that by a targeted control of residual concentrations in the context of a reusing (inclusively the recycling processes and the processing of the starting material, respectively), new properties in a (lyocell-) molded body to be manufactured and its textile subsequent products, respectively, can be achieved. This functionalization which is achieved in this manner of residual components from the starting material which are based on thermoplastic elastomers such as elastane, surprisingly allow for an efficient compensation of (negative) property changes which may result in particular from the portion of recycled cellulose fibers in a (lyocell-) molded body to be manufactured.

In particular, by a targeted portion of residual polymers, in particular elastane, a compensation of the strength values can be achieved, which previously would be significantly decreased by admixing of recycled (short-chain) cellulose. Possibly, the strength may be increased by a higher portion of elastane and decreased by a higher portion of recycled cellulose.

Surprisingly, elastane does not show any incompatibilities, also in an untypically high concentration, in a lyocell-method or viscose-method. In contrast, in interaction with cellulose, a high affinity of the hydrophilic PEG-segments of the elastane with the hydrophilic hydroxy-structures and ether-structures of the cellulose may result. This is increased by a strong tendency of forming hydrogen bonds between the both polymers. Elastane, which is incorporated in cellulose fibers, therefore does not show incompatibilities. The elastane which is incorporated in cellulose fibers can therefore contribute to the functionalization of the molded body to be manufactured. Such a functionalization of plastic-residual components, in particular in a lyocell-method or viscose-method, is previously not known. Therefore, the extensibility and elasticity, respectively, of a molded body, in particular a fiber, can be increased by incorporating elastane.

According to an embodiment, the elastane is processable and does not have to be separated costly and elaborately, but can be processed (e.g. in a lyocell-/viscose-method) without further effort and incorporated into fibers. There, the plastic does not cause negative properties, but even a better fiber extensibility and elasticity, respectively.

In summary, the circumstance is used, that actually undesired components of solid starting materials, such as synthetic plastics, in particular elastane, do not have to be elaborately depleted in the context of the recycling of cellulose, but on the contrary, as addition may even provide positive properties and corresponding advantages, such as an improved extensibility and elasticity, respectively.

In the following, additional embodiments of the molded body and the method are described.

According to an embodiment, the regenerated cellulosic molded body comprises at least 0.01% by weight, in particular at least 0.1% by weight, further in particular 1% by weight, polyurethane, wherein at least 10% by weight of the polyurethane are assigned to elastane. This has the advantage that polyurethane does not have to be depleted in an especially clean manner, which may in fact be technically challenging.

Instead, polyurethane may remain in the starting material, whereby elaborate and cost-intense depleting processes are not necessary anymore. By the fact that at least a part of the polyurethane is assigned to elastane, additionally even further advantages can be achieved, e.g. an improvement of the extensibility, the elasticity or the strength values of the fibers to be manufactured.

According to a further embodiment, the regenerated cellulosic molded body comprises 0.1% to 5% by weight elastane. This has the advantage that negative strength reductions which would otherwise be unavoidable, can be especially efficiently compensated when reusing cellulose fibers.

It was surprisingly found that up to approximately 5% by weight elastane content in (lyocell-) molded bodies (e.g. fibers), no noteworthy change of the (fiber) properties can be detected. Instead, extensibility, elasticity and strength values can be improved which is indeed desirable.

According to a further embodiment, the regenerated cellulosic molded body further comprises at least one further synthetic plastic, in particular less than 2% by weight, from the group which is consisting of polyester, polyamide, polyurethane and polyether. This has the advantage that the technically elaborate and cost-intense depletion of a further plastic at least partially is omitted. Instead, the presence of at least one further synthetic plastic may even influence and control, respectively, the properties of the fiber to be manufactured in an advantageous manner. A portion of less than 2% by weight may be especially advantageous in order to ensure a good integration of a further synthetic plastic into the cellulose fiber.

According to a further embodiment, at least a part of the further synthetic plastic comprises at least one compatibility which is at least one of the group which is consisting of ester-compatibility, amide-compatibility and ether-compatibility. This has the advantage that the at least one further synthetic plastic (e.g. one or more typical fiber polymers, in particular fiber polyester) can be directly used from the starting materials, such as textiles, and efficiently integrated.

Compatibility may in particular denote that two chemical (functional) groups are compatible with each other. For example, a high affinity exists between hydrophilic PEG-segments of elastane with hydrophilic hydroxy-structures and ether-structures of cellulose. In this case, the elastane comprises a cellulose-compatibility and the cellulose comprises an ether-compatibility. The compatibility may also be described as integration of chemical groups among themselves.

Small portions (e.g. below 2% by weight) of polyamides and polyesters may be processed in the recycling-method, in order to obtain a good integration. In a recycling-method, this is an significant advantage, since at least partially removing further synthetic polymers may be disproportionally elaborately. The above-mentioned further synthetic plastics may be contained in starting materials, such as textiles, very frequently and commonly. Therefore, an acceptance of small residual amounts is constituting a massive facilitation of a recycling-method.

Without being bound to a specific theory, the good integrating behavior of the further synthetic plastic may be described by a compatibility between elastane, cellulose and the further synthetic plastic, such as polyamide or polyester. Here, the polyurethane (PUR) portion of elastane is of special interest, since PUR may act both as polyester and polyamide at the same time. The repeating unit of PUR may be described as R1-NH—CO—O—R2, thus comprises an ester-bond (CO—O—R2) and an amide-bond (R1-NH—CO). As already described above, the PEG-portion in elastane, due to its typical ether-structure, is responsible for the good compatibility with the glycan ether-bonds of the cellulose. Therefore, a good homogenization/mixing occurs between the substances. According to an embodiment, a corresponding integrating process may be additionally highly dependent from the temperature of the respective method. The described compatibilities may e.g. also be applied to the embodiments described in the following.

The amide-compatibility of elastane may enable to integrate typical fiber polyamides (e.g. PA6, PA6.6 or PA6.10) from starting materials as textiles.

Moreover, the ester-compatibility of elastane may enable to integrate typical fiber polyester (e.g. PET) from starting materials as textiles.

The ether-structure of elastane may lead to high homogenization in a spinning solution before a spinning process in a lyocell-method or viscose-method and therefore to a good intermixture. In particular also in a chemical context, since the compatibility of the ether-structure of elastane is very similar to the ether-structure of cellulose.

According to a further embodiment, the further synthetic plastic is at least partially incorporated in the cellulose. This has the advantage that also the further synthetic plastic, together with elastane, can directly act within the fiber to influence its properties in an advantageous manner. In this way, e.g. the strength of the fiber may be increased. Moreover, the fibrillation effect can be reduced, when the further synthetic plastic also acts like a melting adhesive. Fibrillation may in particular denote the localized separating of fibrillary elements lengthwise to the fiber axis. In particular when mechanics and humidity act on the fiber at the same time.

According to a further embodiment, the regenerated cellulosic molded body comprises at least one of the features described in the following.

The regenerated cellulosic molded body is selected from the group which comprises a filament, fibers, a foil, a tissue, a fleece, a (micro) sphere, beads and a sponge.

The regenerated cellulosic molded body comprises a fiber extensibility which is at least 10%, in particular at least 20%, higher than the fiber extensibility of a conventional lyocell fiber. With respect to the fiber extensibility of the regenerated cellulosic molded body, it was found that it increases up to 20% (dependent from the elastane-amount) compared to a standard lyocell fiber.

The regenerated cellulosic molded body comprises strength values of a conventional lyocell-fiber. Average fiber dates of a conventional lyocell fiber (e.g. TENCEL®) may be present as follows. Maximum tensile force conditioned (FFk): 40.2 cn/dtex; maximum tensile force wet (FFn): 37.5 cN/dtex, maximum tensile force extension conditioned (FDk): 13.0%, maximum tensile force extension wet (FDn): 18.4% (reference: Lenzinger Berichte 87 (2009) 98-105, table 1). The maximum tensile force (FFk) may thus be in the range from 35 to 45 cN/dtex, in particular from 38 to 42 cN/dtex, the maximum tensile force wet (FFn) may be in the range from 32 to 42 cN/dtex, in particular 35 to 40 cN/dtex. The maximum tensile force extension (FDk) may be in the range from 10% to 15% by weight and the maximum tensile force wet (FDn) in the range from 16% to 20% by weight.

According to an embodiment, the portion of synthetic plastic (elastane, optionally with additional portions of e.g. PET, PUR and PA) may be present in a certain concentration. This may lead to an especially homogenous distribution in a spinning solution, such that the plastic integrates in the spinning process into the (lyocell-) molded body to be manufactured in a homogenous and finely distributed manner. In this way, specific fiber properties may be correspondingly controlled and influenced, respectively.

The regenerated cellulosic molded body further comprises a reduced tendency to fibrillation compared to a conventional lyocell fiber. The surprisingly lower fibrillation tendency which is achieved in this manner may be explained with the fact, that integrated residual plastics, such as elastane, support the sliding of the single, crystalline cellulose strains in the sense of a separating (at least partially amorphous) sliding layer and additionally control the transverse adhesion among the cellulose strains. This may cause that the fibrillation-typical delamination is correspondingly suppressed.

According to a further embodiment, the regenerated cellulosic molded body comprises a portion of synthetic plastic which originates from the starting material by at least 0.1% by weight. This has the advantage, that the molded body can be manufactured in an especially resource-saving manner.

The synthetic plastic in the molded body may originate completely or at least partially from the starting material. Hence, substantially no adding of further plastic is necessary. Furthermore, an elaborate depleting of the plastic out of the starting material may be at least partially omitted.

According to a further embodiment, the starting material may completely or partially comprise remains from a clothing manufacture and/or old clothes (for example mixed textiles). In other words, as at least a part of the starting material, textiles, in particular remains from a clothing manufacture and/or old clothes, may be used. Especially preferred is the utilization of remains from the clothing manufacture, since such an offcut and waste, respectively, frequently comprises a very high cellulose portion and thus a high degree of purity. In particular, such a pre-consumer-textile may be free from foreign matters, such as buttons, seams or textile print. For example, remains from the clothing manufacture may substantially comprise woven (and optionally dyed) cellulose, such that such remains may be directly transferred in solution, if desired, in order to recover cellulose by the lyocell-method. In old clothes or post-consumer-textiles, large foreign matters such as buttons, prints and seams can be separated already during or after mechanical comminuting. Other foreign matters of the remains or old clothes, such as colors and synthetic plastics (such as polyester and elastane), may be removed completely or partially before solving a corresponding starting material for forming the dope and the spinning solution, respectively, or may remain completely or partially in the spinning solution.

According to a further embodiment, the method further comprises: i) solving the starting material in a solvent by a direct solving method, in particular in N-methylmorpholine-N-oxide, NMMO, to obtain a spinning solution, and ii) extruding the spinning solution through spinning nozzle openings, in particular at less than 150° C., such that an at least partially incorporating of synthetic plastic, in particular elastane, into the cellulose is enabled. This has the advantage that a proved and established process can be directly applied, in order to realize an especially efficient integration of synthetic plastic into cellulose.

In principle, plastics can be used for a strength improvement in fibers. However, temperatures of at least 250° C. for melting the plastic, in particular a thermoplastic plastic, are necessary. However, in the context of a lyocell-method or viscose-method, during the extrusion of the spinning solution through spinning nozzle openings, a mechanical stretching and an associated very strong deformation in the longitudinal direction occurs. The massive longitudinal orientation caused by the spinning process can also be transferred to elastane and other synthetic plastics which are located in the spinning solution. The stretched portions, in particular the PEG-portion of the elastane, therefore constitute a good basis for embedding cellulose which is also located in the spinning solution and precipitates substantially at the same time as the synthetic plastic. In this way, plastics in fibers can be efficiently integrated at a temperature of below 150° C. (temperature in the lyocell-method). Here, the synthetic plastic, in particular elastane, is processable and does not have to be separated in an expensive/elaborate manner, but can be co-processed without further effort in a lyocell-method and can be incorporated into the fiber. There, the plastic does not cause negative properties, but even a better fiber extensibility and elasticity, respectively.

By means of a controlled processing of starting material(s), it can be ensured, that further synthetic plastics, such as PUR, PA, PET, PE, remain in a suitable concentration in a lyocell-method or viscose-method. At a correspondingly suitable concentration, the plastic-portions which are present in the spinning solution may behave similar as a composite system fiber-thermoplastic.

In a higher temperature range, at the same time the thermoplastic effect of elastane is usable, when a corresponding elastane amount is present in the cellulose fiber. This leads metaphorically to a certain controllable adhesiveness in an interior of the fiber, which may be correspondingly used for thermoplastic adhesion effects.

According to further embodiment, the method further comprises: supplying into the spinning solution at least one substance from the group which is consisting of cellulose fibers, foreign matters, hemicellulose, pulp and cellulose fibers with short chain length. This has the advantage that properties of the molded body to be manufactured can be controlled and influenced, respectively, in a targeted manner.

In the context of a lyocell-method, cellulose-reinforced lyocell fibers may be manufactured by the fact, that in the NMMO-water-mixture, besides the saturation with cellulose, still an excess of cellulose fibers remains in the spinning solution and is commonly spun. This may cause an additional strength improvement of the resulting lyocell fiber by the effect of a "fiber reinforcement in the fiber". Thereby, it may be enabled to compensate also further strength-reducing effects which are caused by starting materials such as textiles. In this way, e.g.

i) foreign components which are hardly soluble in NMMO can also be used, which are already present as fibers in old textiles;
ii) strength-reducing further sugars such as hemicellulose may be bound; and
iii) cellulose fiber portions with short chain length can be used in a larger amount.

Thereby, also foreign fibers and foreign materials can be bound in the lyocell fiber, which do not possess reinforcing properties, but rather are strength-reducing.

Usually, e.g. short chain lengths lead to a strength-reduction. By the mentioned compensation by elastane and optional further synthetic plastics, despite the high portion of short-chain cellulose, a strength similar to the values of a non-recycled cellulose fiber may therefore be achieved again. In particular, the multiple passing through a substance cycle causes a general reduction of the chain lengths. By exterior influences (sun, washing, aging, chemicals), in the context of the previous manufacturing-, using-, and disposing cycle, respective cellulose chains are broken, which generally may lead to shorter chain lengths in a molded body to be manufactured.

The term "hemicellulose" may in particular be a generic term for mixtures of polysaccharides (multiple sugars) occurring in plant biomass in varying composition. As most common monomers (monosaccharides, single sugars), pentoses, e.g. xylose and mannose, may be denoted.

According to a further embodiment, the starting material comprises at least one further synthetic plastic from the group which is consisting of polyester, polyamide, polyurethane and polyether. This has the advantage that the technically elaborate and cost-intense depleting of a further plastic is at least partially omitted. Instead, the presence of at least one further synthetic plastic may even influence and control, respectively, the properties of the fiber to be manufactured in an advantageous manner.

According to a further embodiment, the method further comprises: at least partially retaining a first additional synthetic plastic, in particular one of the group which is consisting of polyester, polyamide and polyether, of the starting material for generating the regenerated cellulosic molded body, such that the first additional synthetic plastic is substantially contained in the molded body which comprises cellulose. This has also the advantage that the technically elaborate and cost-intense depleting of a further plastic is at least partially omitted. Instead, the presence of at least one further synthetic plastic may even influence and control, respectively, the properties of the fiber to be manufactured in an advantageous manner.

In addition or alternatively, the method further comprises: removing, in particular completely removing, further in particular selectively removing (selectively depleting) a second additional synthetic plastic, in particular one of the group which is consisting of polyester, polyamide and polyether, from the starting material, such that the second additional synthetic plastic substantially is not contained in the regenerated cellulosic molded body which comprises cellulose. This has the advantage that the desired portions of plastics, e.g. PET and PUR, can be adjusted in an especially proper (targeted) manner. The first and the second additional synthetic plastic may be the same. The first and the second additional synthetic plastic may also be different.

A correspondingly manufactured recycled (lyocell-) molded body may have properties which are very similar to that of a non-recycled cellulose fiber. In particular, by additionally adding recycled lyocell-tissue, the properties may be still further approximated to that of non-recycled lyocell-fibers, such that, by measurement, barely a difference can be detected.

According to a further embodiment, the method further comprises: i) supplying at least one further starting material which comprises cellulose and at least one synthetic plastic, in particular a synthetic plastic from the group which is consisting of elastane, polyester, polyamide, polyether and polyurethane, wherein the portion of synthetic plastic in the starting material and the further starting material is different; and ii) generating the regenerated cellulosic molded body based on the starting material and the further starting material, such that the regenerated cellulosic molded body comprises at least one predetermined property. This has the advantage that substantially without the utilization of chemical methods, the desired portions of synthetic plastic may be correspondingly adjusted and influenced, respectively.

In a preferred embodiment, residual amounts of synthetic plastic in starting materials are adjusted to a specific amount. The regenerated cellulosic molded body manufactured after adding multiple specific starting materials, may then comprise desired plastic-concentrations and compositions, respectively, and corresponding specific chemical/physical properties. These may be properties which correspond to that of a non-recycled lyocell-fiber.

In particular, by mixing different compositions of starting materials, such as old clothes and/or remains from the clothing manufacture, a specific property, e.g. the concentration of elastane and optionally at least one further synthetic plastic, can be adjusted and therefore the subsequent use and/or functionalization can be specifically controlled.

In a further preferred embodiment, different starting materials with a different composition are mixed, such that the desired portions of the different plastics are adjusted. This chemistry-reduced/chemistry-free embodiment (achieved only by mixing of starting materials) may be considered as especially advantageous with respect to resource consumption and ecological aspects.

According to an embodiment, the method may comprise a post-processing of the precipitated cellulose for obtaining the molded body from the preform of the molded body. Such an optional post-processing may comprise a drying, impregnating and/or reshaping of the obtained cellulose-filaments, for example. By a corresponding post-processing, it is possible to finish the molded body manufacture at the end of the lyocell-method in an application-specific manner.

According to an embodiment, fibers of the starting material and/or fibers of the molded body may comprise a smooth round outer surface. As illustrated in FIG. 3, cellulose fibers extracted by means of the lyocell-method are characterized by such a shape and therefore differ from other fiber shapes, as they occur in natural cotton or are obtained by a viscose-method.

The molded bodies manufactured according to the invention may be used as packaging material, fiber material, textile composite materials, fiber composite materials, fiber fleeces, needle felts, quilting cotton, tissues, knitted fabrics, home textiles such as bedclothes, as clothes, as filling agent, flocking substance, hospital textiles such as underlays, diaper or mattresses, as fabric for heating blankets, shoe inserts and wound dressings. Embodiments of the invention may be applicable in both different technical fields and in medicine and in cosmetics and wellness. In medicine, for example materials for wound treatment and wound healing may be made of a carrier which determines the mechanical properties and a biocompatible coating material which is especially compatible with the skin and with the surface of the wound. Many other applications are possible.

BRIEF DESCRIPTION OF THE DRAWINGS

In the following, exemplary embodiments of the present invention are described in detail with reference to the following figures.

DETAILED DESCRIPTION

Figure 1:
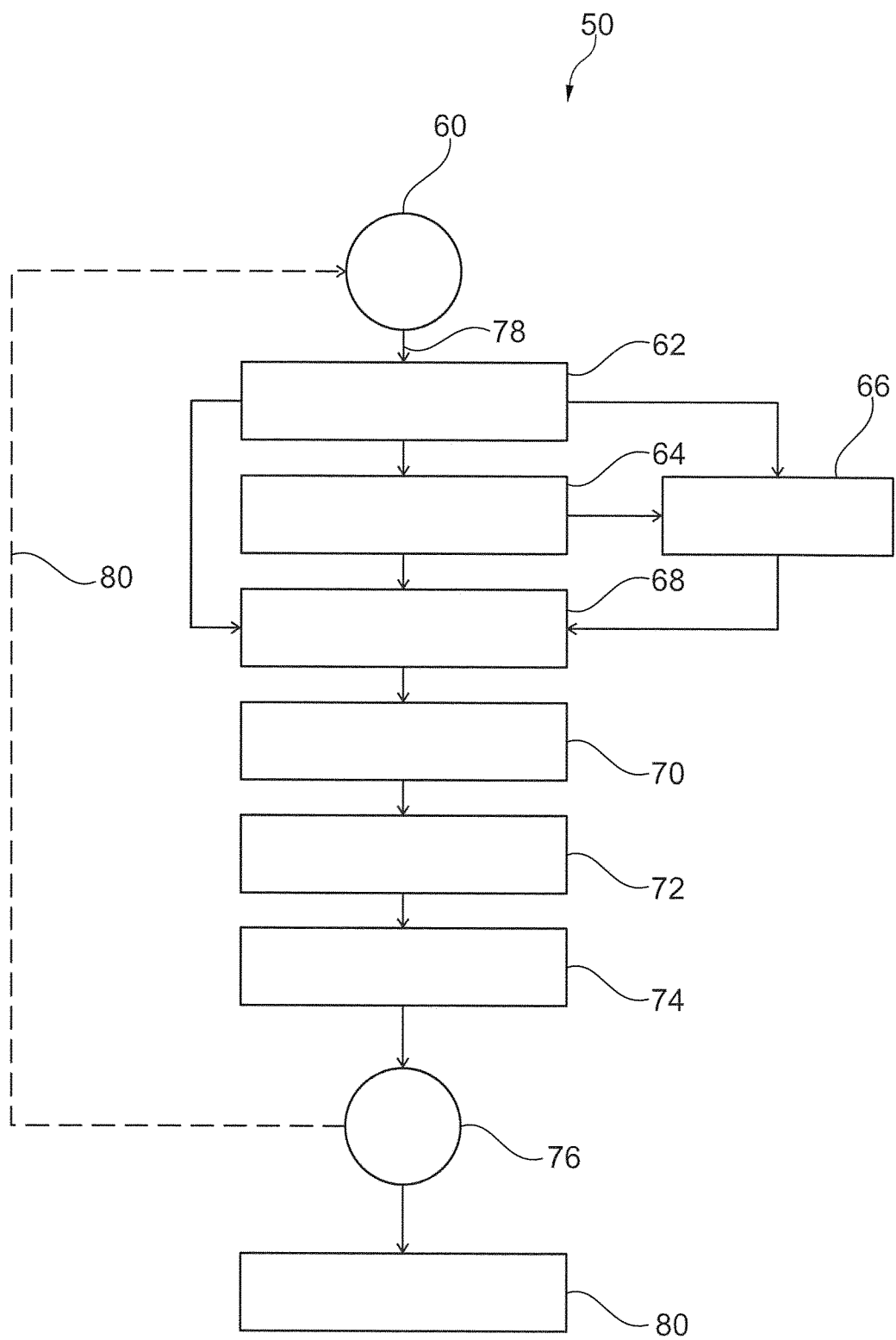
FIG. 1 shows a flow diagram of a method of manufacturing a regenerated cellulosic molded body according to an exemplary embodiment of the invention.

Same or similar components in different figures are provided with the same reference numbers.

Before, referring to the figures, exemplary embodiments are described, some basic considerations shall be summarized based on which exemplary embodiments of the invention have been derived.

According to an exemplary embodiment of the invention, residual polymers from starting materials are used as adhesion promoter between cellulose fibers or as thermoplastic properties promoter within a lyocell-molded body. They stay substantially inert until the completion of a certain step in the production process. In particular, a belated reinforcement of a tissue by heat (analog to melting adhesive) may thus be achieved (e.g. non-iron shirts, pleating, etc.). For manufacturing tissues which have the property of a high dimensional stability (e.g. non-iron), an elaborate method is typically used. For example, this may be the combination of highly elaborate chemical methods, such as a treatment with liquid ammoniac. It makes the shirt look like a new one for a long term. The so-called "humid cross-linking" is also possible, wherein between the molecules of cotton cellulose, an elastic bridge is built. This bridge pulls the textile back in form after washing. However, the humid cross-linking with "synthetic resins" requires a very precise mode of operation.

By the targeted control of the portion of residual polymers (e.g. polyurethane from the elastane from old textiles), according to an embodiment, a certain thermoplasticity in a lyocell fiber can be obtained, which re-supplies the corresponding portion of residual polymers from a starting material back into a lyocell-molded body via the depleting process, according to an embodiment of the invention, via a lyocell-method.

According to a further exemplary embodiment of the invention, the thermoplastic properties of residual polyurethane, in particular thermoplastic polyurethane (TPU) are utilized. The different properties, which are known from this substance group, with respect to hard phase and soft phase and their different degree of crystallization can, by a control of the processing time and the processing temperature (hence the exposure time and the temperature of the spinning solution), influence the functionalization of residual plastics as additional factor. The following properties can be combined:

i) highly crystalline and on the other hand transparent TPU complement each other in the application fields to manifold application possibilities and high variation range of the material;

ii) a soft phase which is coupled to methylene diphenylisocyanate (MDI) on the one hand consists of polyesterdiols with a molar weight between 1000 and 2000 g/mol on the basis of adipic acid or it consists of pure polycaprolactone. On the other hand, polyether diols made of tetrahydrofuran or C2, C3-glycols are possible. Depending on the application case, it may be decided which soft phase is suitable. Two substantial aspects are the sensitivity to oxidation of the ether-TPU and the susceptibility to hydrolysis of the ester-TPU.

From organic chemistry, the reaction of an ether with oxygen to hydroperoxide and alcohol is known, which leads in the case of a polymer to a chain break, thus to a molar weight-degradation. This causes the necessity to stabilize polyether-types with corresponding aging protection agents (e.g. hindered phenols), to appropriately increase the lifetime. When ether-TPU and ester-TPU are compared in an air aging at 100° C. over time, the better resistance of the polyester becomes highly apparent. Here, the reduction of the tensile strength over the storage time was measured.

In contrast, an ether-TPU is characterized by a good resistance against hydrolytic and microbial degradation. Therefore, extreme applications in an exterior are suitable utilization profiles for polyether-types. When a high influence of light is present, it can be additionally stabilized against damages by UV-light.

Based on the above discussed, it is possible to advance in the fields of soft TPU without softener. Previously, this was not successfully performed, since with the reduction of the hard phase portion, the TPU does not only become softer, but also more plastic, and is re-crystallized much too slow after the thermoplastic processing, to be able to produce finished parts within an acceptable time. Furthermore, a further effect is recognizable, which is the slow crystallization of the short hard phase blocks. When namely the portion of hard phase is significantly reduced, also the crystallizing blocks become notably shorter. This reduces the melting temperature, but also the recrystallization. This slow crystallization additionally causes a gradual post-curing of the material after the processing.

Since for a delivered starting material of unknown origin, the corresponding detailed material parameters are often not known, by a dynamic adaption of the described processing parameters (time and temperature) in the spinning solution, a universalization for the main part of the recycled PUR can be found which leads to the desired material properties. Alternatively, for different variants of PUR in the raw recyclate, by corresponding portion variations, an adaption (even a dynamic adaption in the context of a Conti-process, if required) of the process stability can be achieved without impairing the material parameters of the resulting lyocell-molded body.

FIG. 1 shows a flow diagram 50 of a method of manufacturing a regenerated cellulosic molded body 102 (compare FIG. 2) according to an exemplary embodiment of the invention.

The starting material 110 (compare FIG. 2) comprises cellulose and elastane, optionally further synthetic plastics and is present in form of old clothes and/or remains from a clothing manufacture.

As illustrated by the block 60, a such manufactured starting material 110, in the case of old clothes, can be used by a consumer, for example as clothes. When the consumer disposes the clothes, it may be used as post-consumer starting material 110 for a subsequent lyocell-method or viscose-method, wherein the former is described in more detail in the following.

Alternatively or in addition, it is also possible to use a pre-consumer starting material 110 which comprises cellulose, for example offcut remains from the clothing manufacture.

In the following, it is described how on basis of the starting material 110 which is at least partially comprising cellulose, molded bodies 102 made of cellulose may be manufactured according to an embodiment of the invention. For this purpose, the starting material 110 is supplied to a device 100 (see FIG. 2) for performing a lyocell-method, compare reference sign 78.

There, first a mechanical comminuting 62 of the starting material 110 is performed by shredding. Thereby, mainly large non-cellulosic impurities may be removed from the starting material 110, for example buttons, seams and prints of the old clothes, which have been at least partially used for generating the starting material 110. By mechanically comminuting 62, the starting material 110 can be separated into single fibers, for example.

It is also possible (see block 64) to utilize the starting material 110 which is comprising cellulose commonly with other materials which are comprising cellulose, for the subsequent lyocell-method. Thus, the starting material 110 can be mixed with a further starting material which comprises cellulose and at least one synthetic plastic, see block 64. This supplied further starting material comprises a portion of synthetic plastics, which is different from the portion of synthetic plastic in the starting material 110. Generating the regenerated cellulosic molded body can now be performed based on the starting material 110 and the further starting material, such that the regenerated cellulosic molded body 102 contains a predetermined portion of synthetic plastic. Alternatively or in addition, the further starting material may comprise remains from a clothing manufacture.

Directly after the mechanical comminuting 62 and directly after the mixing 64, respectively, directly solving 68 of the (pure and mixed, respectively) starting material 110 in a further solvent 116 (for example tertiary amine oxides, such as N-methylmorpholine-N-oxide (NMMO)) can be performed without chemical pretreatment in an advantageous manner. In more detail, the mechanically comminuted (and optionally mixed) starting material 110 may be directly transferred in solution, in particular without chemical cleaning and without adjusting the viscosity. In this way, the manufacturing method and recycling method, respectively, can be performed in an extraordinary simple and fast and ecological manner. It has surprisingly turned out that after mechanically comminuting 62, elastane as remaining foreign matter (but also further synthetic plastics) in the starting material 110 does not disturb the lyocell-method and does not negatively influence the quality of the recovered lyocell-cellulose. In contrast, certain amounts of elastane may remain in the manufactured cellulose fibers without deteriorating their properties, but to even improve them. Also certain amounts of remaining polyester do not disturb the obtained product.

Alternatively, the method may optionally comprise a chemical cleaning 66 of the starting material 110 after mechanically comminuting 62 (or after mixing 64) and before solving 68. Such an optional cleaning 66 may comprise at least partially removing dyes by bleaching. Therefore, it is possible to completely or partially discolor the starting material 110 before subsequently solving 68 the starting material 110 in solvent 116, for example in order to manufacture white or gray molded bodies 102. Alternatively or in addition, it is also possible that, in the context of the optional chemical cleaning 66, the starting material 110 (before or after solving 68 it) is at least partially freed from cross-linkers which are cross-linking fibers of the starting material 110. In applications in which such cross-linkers between the fibers of the starting material 110 are present, the starting material 110 may be completely or partially freed from the cross-linker by means of an alkaline or acid pretreatment, for example. This additionally improves the solubility of the starting material 110. By means of the cleaning 66, optionally at least a part of the synthetic plastic may be removed, if desired. For example, in this way the portion of synthetic plastic in the molded body 102 to be manufactured can be adjusted and influenced, respectively.

After solving 68 the starting material 110 in solvent (preferably NMMO), the obtained lyocell-spinning solution 104 may be pressed through one or more spinning nozzles, whereby threads and filaments, respectively, with a honey-like viscosity are generated (see block 70 concerning this spinning).

During and/or after the falling of these threads and filaments, respectively, these are brought in operational connection with an aqueous environment and therefore diluted. Thereby, the concentration of the solvent 116 of the threads and filaments, respectively, is reduced in an aqueous fog and an aqueous liquid bath, respectively, to such an extent that the lyocell-spinning solution is transferred to a solid phase made of cellulose-filaments. In other words, a precipitating, depositing or coagulating of the cellulose-filaments occurs, see reference sign 72. Therefore, a preform of the molded body 102 is obtained.

Generating 80 the regenerated molded body 102 which comprises cellulose and elastane incorporated in the cellulose, in particular solving 68, spinning 70 and subsequently precipitating 72, by means of a lyocell-method, is thus performed based on a starting material 110 which itself comprises cellulose and elastane.

Furthermore, the method may comprise a post-treating 74 of the precipitated lyocell-cellulose for obtaining the molded body 102 from the preform of the molded body 110. Such a posttreatment may encompass a drying, impregnating and/or reshaping of the obtained filaments to the final molded body 102, for example. For example, the molded body 102 may be processed by means of the described manufacturing method to fibers, a foil, a tissue, a fleece, a sphere, a porous sponge or beads and may then be supplied to a further use (see reference sign 76).

With advantage, after using the molded body 102, its cellulose and elastane may be again recovered by performing a further method corresponding to the process steps between reference signs 78 and 74 (see block 80). Alternatively, the cellulose, the elastane and the optional further synthetic plastic of the molded body 102 may be recovered in a further method (see further block 80), for example a viscose method. This multiple repeatability of the recycling by means of repeated process stages is enabled by the knowledge that an improvement of fiber properties, in particular the strength, is surprisingly properly enabled by a recycling of elastane-containing cellulose starting materials.

Figure 2:
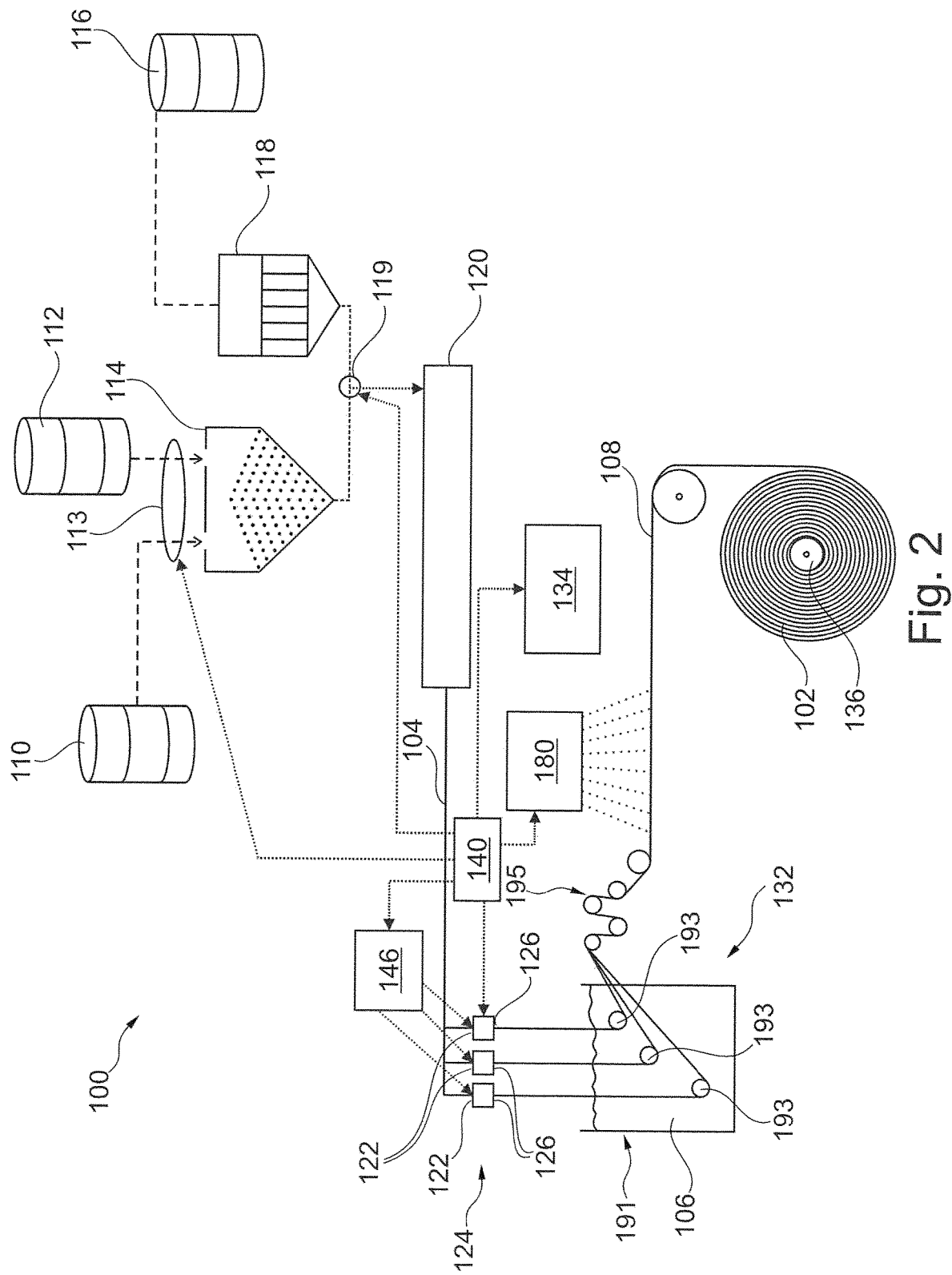
FIG. 2 shows a device for manufacturing a regenerated cellulosic molded body by a lyocell-method according to an exemplary embodiment of the invention.

FIG. 2 shows a device 100 for manufacturing a regenerated cellulosic molding body 102 by means of a lyocell-method on basis of a starting material which comprises cellulose and elastane, according to an exemplary embodiment of the invention which is described with reference to FIG. 1.

Thus, FIG. 2 shows a device 100 according to an exemplary embodiment of the invention for manufacturing a cellulose-comprising molded body 102 which may be manufactured in form of a fleece (nonwoven), as fiber, foil, sphere, textile tissue, sponge, or in form of beads or flakes, for example. According to FIG. 2, the molded body 102 is manufactured directly from a spinning solution 104. The latter is converted to cellulose fibers 108 as molded body 102 by means of a coagulation-fluid 106 (in particular made of air humidity) and/or a coagulation-bath 191 (for example a water bath which optionally comprises tertiary amine oxides such as N-methylmorpholine-N-oxide (NMMO)). By means of the device 100, a lyocell-method may be performed. In this way, substantially endless filaments or fibers 108 or mixtures of substantially endless filaments and fibers 108 with a discrete length may be manufactured as molded body 102, for example. A plurality of nozzles which respectively have one or more openings 126 (which may be also denoted as spinning holes) are provided for ejecting the lyocell-spinning solution 104.

As can be taken from FIG. 2, a starting material 110 which is based on cellulose may be supplied to a storage tank 114 via a dosing device 113.

According to an embodiment, a water ingress in the cellulose-based starting material 110 may occur by a solvent 116 (in particular NMMO) which is described in more detail below. Furthermore, the cellulose-based starting material 110 itself may contain a certain residual moisture (dry pulp frequently has a residual moisture of 5 weight percent to 8 weight percent, for example). In particular, according to the described embodiment, the starting material 110 may directly be supplied to a mixture of water and solvent 116 without pre-moistening. An optional water container 112 which is shown in FIG. 2 may then be omitted.

According to an alternative embodiment, the starting material 110 which is comprising cellulose may be additionally moistened, in order to therefore provide moist cellulose. For this purpose, water from an optional water container 112 may be supplied to the storage tank 114 via the dosing device 113. Therefore, the dosing device 113 which is controlled by a control device 140 may supply adjustable relative amounts of water and starting material 110 to the storage tank 114.

A suitable solvent 116, preferably tertiary amine oxides such as N-methylmorpholine-N-oxide (NMMO) and an aqueous mixture of the solvent 116, respectively, for example a 76% solution of NMMO in water, is contained in a solvent container. The concentration of the solvent 116 may be adjusted in a concentrating device 118 either by supplying pure solvent or water. The solvent 116 may then be mixed with the starting material 110 with definable relative amounts in a mixing unit 119. Also the mixing unit 119 may be controlled by the control unit 140. Thereby, the cellulose-comprising starting material 110 is solved in the concentrated solvent 116 in a solving device 120 with adjustable relative amounts, whereby the lyocell-spinning solution 104 is obtained. The relative concentration ranges (also denoted as spinning window) of the components starting material 110, water and solvent 116 in the spinning solution 104 for manufacturing cellulosic regenerated molded bodies according to the lyocell-method may be suitably adjusted as known to a person skilled in the art.

The lyocell-spinning solution 104 is supplied to a fiber generating device 124 (which may be configured with a number of spinning beams or jets 122).

When the lyocell-spinning solution 104 is guided through the openings 126 of the jets 122, it is separated into a plurality of parallel threads made of the lyocell-spinning solution 104. The described process flow transforms the lyocell-spinning solution 104 to increasingly long and thin threads whose properties may be adjusted by a corresponding adjustment of the process conditions, controlled by the control unit 140. Optionally, a gas flow may accelerate the lyocell-spinning solution 104 on its way from the openings 126 to a fiber receiving unit 132.

After the lyocell-spinning solution 104 has moved through the jets 122 and further downwards, the long and thin threads of the lyocell-spinning solution 104 interact with the coagulation-fluid 106.

In the interaction with the coagulation-fluid 106 (for example water), the solvent concentration of the lyocell-spinning solution 104 is reduced, such that the cellulose of the starting material 110 at least partially coagulates and precipitates, respectively, as long and thin cellulose fibers 108 (which may still contain residues of solvent and water).

During or after the initial formation of the individual cellulose fibers 108 from the extruded lyocell-spinning solution 104, the cellulose fibers 108 are received at the fiber receiving unit 132. The cellulose fibers 108 may immerse into the coagulation-bath 191 shown in FIG. 2 (for example a water bath optionally comprising a solvent such as NMMO) and may complete their precipitation when interacting with a liquid of the coagulation-bath 191. Depending on the process adjustment of the coagulation, the cellulose may form cellulose fibers 108 (as shown, wherein the cellulose fibers 108 may be made of one substance and integrally merged with each other ("merging"), respectively, or may be present as separated cellulose fibers 108) or a foil and a film, respectively, made of cellulose may form at the fiber receiving unit 132 (not illustrated in FIG. 2).

Thus, the cellulose fibers 108 are extruded out of the spinning nozzles of the jets 122 and are guided through the spinning bath and coagulation-bath 191, respectively (for example containing water and NMMO in low concentration for precipitation/coagulation), wherein the cellulose fibers 108 are guided around a respective deflection roll 193 in the coagulation-bath 191 and are supplied to a draw-off godet outside the coagulation-bath 191. The draw-off godet 195 serves for further transport and post-stretching of the cellulose fibers 108, in order to achieve a desired titer. Downstream the draw-off godet 195, the fiber bundle made of the cellulose fibers 108 is washed in a washing unit 180, optionally scrooped and subsequently cut (not shown).

Although not illustrated in FIG. 2, the solvent 116 of the lyocell-spinning solution 104 which is removed from the cellulose fibers 108 when coagulating and in a subsequent washing in the washing unit 180, may at least partially be recovered and recycled, respectively, and may be transferred back to the storage tank 114 in a subsequent cycle.

During the transport along the fiber receiving unit 132, the molded body 102 (here in form of the cellulose fibers 108) may be washed by means of the washing unit 180, as the latter supplies a washing liquid for removing solvent residues. Thereafter, the molded body 102 may be dried.

Moreover, the molded body 102 may be made subject to a posttreatment, see the schematically illustrated posttreatment unit 134. For example, such a posttreatment may comprise a hydro-entangling, a posttreatment, a needle treatment, an impregnation, a steam treatment with a steam which is supplied under pressure and/or a calendaring, etc.

The fiber receiving unit 132 may supply the molded body 102 to a winding device 136, at which the molded body 102 may be winded. The molded body 102 may then be supplied as rolling freight to an entity which manufactures products such as wipes or textiles on basis of the molded body 102.

Figure 3:
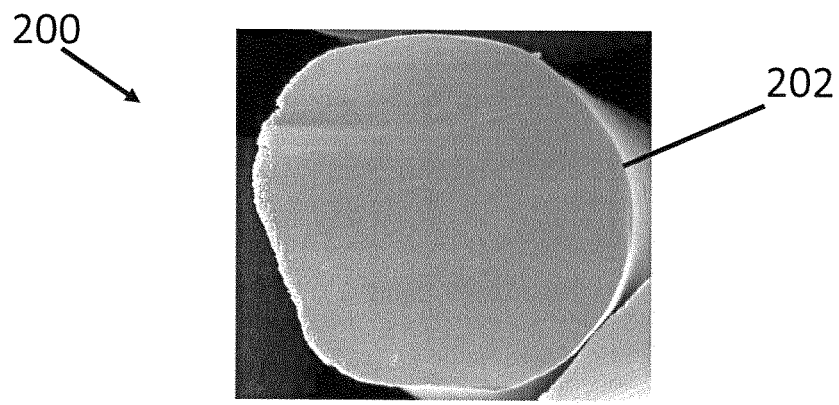
FIG. 3 shows a cellulose fiber which is manufactured by a lyocell-method.

FIG. 3 shows a cellulose fiber 200 which is manufactured by means of a lyocell-method in cross-section. The cellulose fiber 200 which is manufactured by means of a lyocell-method has a smooth round outer surface 202 and is homogenous and free from macroscopic holes filled with cellulose material. Therefore, it can be unambiguously distinguished from cellulose fibers which are manufactured by means of a viscose-method (see reference sign 204 in FIG. 4) and from cellulose fibers of cotton plants (see reference sign 206 in FIG. 5) by a person skilled in the art.

Figure 4:
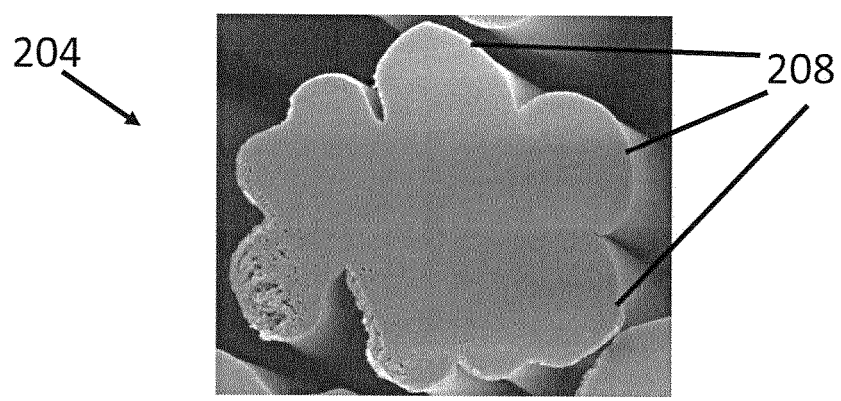
FIG. 4 shows a cellulose fiber which is manufactured by a viscose-method.

FIG. 4 shows a cellulose fiber 204 which is manufactured by means of a viscose-method in cross-section. The cellulose fiber 204 is cloud-shaped and comprises a plurality of arc-shaped structures 208 along its outer circumference.

Figure 5:
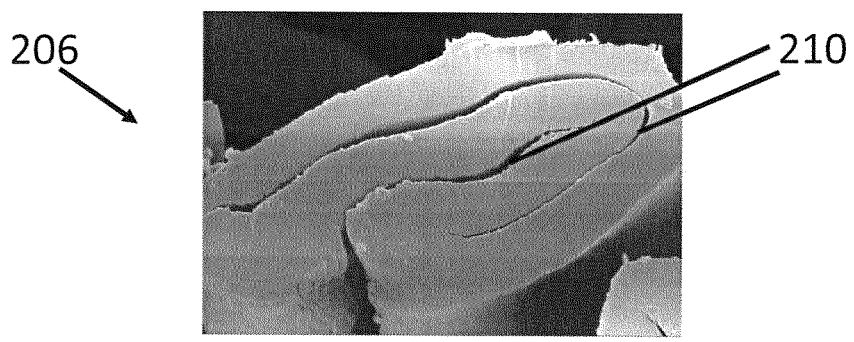
FIG. 5 shows a natural cellulose fiber of a cotton plant.

FIG. 5 shows a natural cellulose fiber 206 of a cotton plant in cross-section. The cellulose fiber 206 is kidney-shaped and comprises a lumen 210 which is free from material as a fully circumferentially enclosed hollow in an interior.

By means of the significant geometric and structural, respectively, differences of the fibers according to FIG. 3 to FIG. 5, it is possible for a person skilled in the art to unambiguously determine, for example by means of a microscope, if a cellulose fiber is formed by means of the lyocell-method, by means of the viscose-method, or naturally in a cotton plant.

In addition, it should be noted that "comprising" does not exclude other elements or steps and "a" or "an" does not exclude a multiplicity. Furthermore, it should be noted that features or steps which are described with reference to one of the above embodiments may also be used in combination with other features or steps of other above described embodiments. Reference signs in the claims should not be construed as a limitation.

The invention claimed is:

1. A regenerated cellulosic molded body manufactured according to a lyocell-method or a viscose-method consisting essentially of cellulose and elastane, wherein the elastane is incorporated in the molded body,
wherein the regenerated cellulosic molded body comprises at least 0.1% by weight elastane, and
wherein the regenerated cellulosic molded body as a whole is manufactured from a spinning solution.

2. The regenerated cellulosic molded body according to claim 1,
wherein the regenerated cellulosic molded body comprises at least 0.1% by weight polyurethane, and
wherein at least 10% by weight of the polyurethane are assigned to elastane.

3. The regenerated cellulosic molded body according to claim 1, wherein the regenerated cellulosic molded body comprises between 0.1% by weight and 5% by weight elastane.

4. The regenerated cellulosic molded body according to claim 1, further comprising at least one further synthetic plastic of the group consisting of polyester, polyamide, polyurethane and polyether.

5. The regenerated cellulosic molded body according to claim 4, wherein at least a part of the further synthetic plastic comprises at least one compatibility which is at least one of the group which is consisting of ester-compatibility, amide-compatibility and ether-compatibility.

6. The regenerated cellulosic molded body according to claim 4, wherein the further synthetic plastic is at least partially incorporated in the cellulose.

7. The regenerated cellulosic molded body according to claim 1, wherein the regenerated cellulosic molded body comprises at least one of the following features:
   the regenerated cellulosic molded body is selected from the group which comprises a fiber, a foil, a sphere or a sponge;
   the regenerated cellulosic molded body comprises an extensibility which is at least 10% by weight higher than the fiber extensibility of a conventional lyocell fiber;
   the regenerated cellulosic molded body comprises strength values of a conventional lyocell fiber;
   the regenerated cellulosic molded body comprises a reduced tendency to fibrillation compared to a conventional lyocell fiber.

* * * * *